(12) United States Patent
Sanmartin

(10) Patent No.: US 12,496,729 B2
(45) Date of Patent: Dec. 16, 2025

(54) DEVICE FOR HANDLING PRODUCTS IN INDIVIDUAL OR GROUPED CONTAINERS BASED ON MOVEMENT BY ELASTIC PRESSURE IN THE TOP OF THE CONTAINERS

(71) Applicant: MÁQUINAS SANMARTIN LTDA, Caxias do Sul (BR)

(72) Inventor: José Bernardo Sanmartin, Caxias do Sul (BR)

(73) Assignee: Máquinas Sanmartin Ltda, Caxias do Sul (BR)

( * ) Notice: Subject to any disclaimer, the term of this patent is extended or adjusted under 35 U.S.C. 154(b) by 406 days.

(21) Appl. No.: 17/441,464

(22) PCT Filed: Mar. 28, 2019

(86) PCT No.: PCT/BR2019/050111
§ 371 (c)(1),
(2) Date: Sep. 21, 2021

(87) PCT Pub. No.: WO2020/191467
PCT Pub. Date: Oct. 1, 2020

(65) Prior Publication Data
US 2022/0152840 A1    May 19, 2022

(30) Foreign Application Priority Data

Mar. 22, 2019    (BR) ...................... 10 2019 005708 4

(51) Int. Cl.
*B25J 13/08*    (2006.01)
*B25J 9/16*    (2006.01)
*B25J 15/00*    (2006.01)

(52) U.S. Cl.
CPC ........... *B25J 13/081* (2013.01); *B25J 9/1694* (2013.01); *B25J 15/0033* (2013.01)

(58) Field of Classification Search
CPC .... B25J 13/081; B25J 9/1694; B25J 15/0033; B25J 15/00; B65G 47/086; B65G 47/908
See application file for complete search history.

(56) References Cited

U.S. PATENT DOCUMENTS 1,298,064 A * 3/1919 Lichtenthaeler ........ B66C 1/422
                                                      294/902
4,500,126 A * 2/1985 Tur-Kaspa ................ B25J 15/00
                                                      294/92

(Continued)

FOREIGN PATENT DOCUMENTS

BR    102013028955 A2    10/2014
DE    102013204095 A1 *  9/2014    ........... B65G 47/084

(Continued)

OTHER PUBLICATIONS

PCT International Search Report for PCT Application No. PCT/BR2019/050111 mailed Dec. 13, 2019 (4 pages).

(Continued)

*Primary Examiner* — Anna K Kinsaul
*Assistant Examiner* — Mobeen Ahmed
(74) *Attorney, Agent, or Firm* — Maier & Maier, PLLC

(57) ABSTRACT

The present patent application for the invention of a device, coupled to a robot or other handling system, deals with the pressure on the container, which allows the product to be moved to be held, moving and rotating them, defining their positioning and organizing them for later palletizing or positioning for subsequent operations. The invention comprises a device (D) composed of a headstock or structure (1) made of metal or another type of material, to be coupled, by means of a coupling (2), to a robot (R1) or other handling equipment; and, in the lower part of the device (D), an elastic blanket (3) made of material such as elastic/polymer is installed, which must have the property of maintaining the integrity of the product handled, in this case the container (Continued)

(4), single or grouped, and allow it to be moved over the work area (A1). The device (D), according to the invention, is operated from movements for the formation of layers or mosaics (M) from a dedicated software, and this association enables the movement of the containers (4) in transverse and longitudinal axes, or swivels.

10 Claims, 26 Drawing Sheets

(56) References Cited

U.S. PATENT DOCUMENTS

| | | | | |
|---|---|---|---|---|
| 4,708,383 | A * | 11/1987 | Deringer | B25J 15/0475 294/902 |
| 4,911,608 | A * | 3/1990 | Krappitz | B65G 59/023 414/796 |
| 4,913,617 | A * | 4/1990 | Nicholson | B25J 9/0084 901/29 |
| 5,967,292 | A * | 10/1999 | Corrales | B65G 47/244 198/457.07 |
| 6,382,692 | B1 * | 5/2002 | Schmalz | B66C 1/0212 294/189 |
| 8,074,431 | B1 * | 12/2011 | Pierson | B65G 61/00 53/529 |
| 8,157,308 | B2 * | 4/2012 | Pedersen | B25J 11/0045 294/213 |
| 8,287,015 | B2 * | 10/2012 | Hawes | B25J 11/0045 294/902 |
| 8,632,110 | B2 * | 1/2014 | Waizenegger | B25J 15/0028 294/902 |
| 8,777,552 | B2 * | 7/2014 | Ward | B65G 57/00 414/736 |
| 9,771,220 | B1 * | 9/2017 | Honeycutt | B65G 15/42 |
| D845,372 | S * | 4/2019 | Pentzer | D15/199 |
| 10,279,484 | B2 * | 5/2019 | Birglen | B25J 15/12 |
| 10,518,423 | B2 * | 12/2019 | Curhan | B25J 15/12 |
| 11,202,453 | B2 * | 12/2021 | Overby | B65B 35/16 |
| 2005/0246056 | A1 * | 11/2005 | Marks | B65G 57/245 700/213 |
| 2008/0118340 | A1 * | 5/2008 | Baumstimler | B65G 47/908 901/31 |
| 2010/0133862 | A1 * | 6/2010 | Hawes | B25J 15/12 294/2 |
| 2010/0215473 | A1 * | 8/2010 | Pedersen | B25J 11/0045 414/800 |
| 2010/0228385 | A1 * | 9/2010 | Beck | B65G 1/1378 715/777 |
| 2012/0009053 | A1 * | 1/2012 | Boschi | B65G 47/904 414/799 |
| 2013/0238129 | A1 * | 9/2013 | Rose | B25J 19/0029 700/258 |
| 2014/0142755 | A1 * | 5/2014 | Iruma | B25J 9/1687 700/247 |
| 2014/0363264 | A1 * | 12/2014 | Gowa | B25J 5/007 414/539 |
| 2014/0369800 | A1 * | 12/2014 | Marks | B25J 9/0093 414/792.8 |
| 2015/0115636 | A1 * | 4/2015 | Shiomi | B25J 15/00 901/39 |
| 2017/0203443 | A1 * | 7/2017 | Lessing | B25J 15/10 |
| 2017/0267467 | A1 * | 9/2017 | Kimoto | G05B 19/41865 |
| 2017/0291806 | A1 * | 10/2017 | Lessing | B65C 3/26 |
| 2018/0162655 | A1 * | 6/2018 | Slavinski | B65G 47/26 |
| 2018/0264648 | A1 * | 9/2018 | Kim | B25J 19/02 |
| 2019/0016543 | A1 * | 1/2019 | Turpin | B65G 59/02 |
| 2019/0039838 | A1 * | 2/2019 | Curhan | B25J 15/0616 |
| 2019/0111571 | A1 * | 4/2019 | Curhan | B25J 15/0023 |
| 2019/0143538 | A1 * | 5/2019 | Curhan | F16B 33/004 294/119.3 |
| 2019/0144211 | A1 * | 5/2019 | Winzinger | B65G 43/00 700/218 |
| 2019/0176346 | A1 * | 6/2019 | Ma | B25J 19/023 |
| 2019/0261565 | A1 * | 8/2019 | Robertson | G06F 18/24323 |
| 2019/0299424 | A1 * | 10/2019 | Curhan | B25J 15/0253 |
| 2019/0344448 | A1 * | 11/2019 | Wicks | B25J 9/0093 |
| 2020/0215702 | A1 * | 7/2020 | Takahashi | B25J 15/12 |
| 2020/0262074 | A1 * | 8/2020 | Proulx | B25J 19/023 |
| 2021/0308871 | A1 * | 10/2021 | Masuda | B24B 27/00 |

FOREIGN PATENT DOCUMENTS

| | | | |
|---|---|---|---|
| DE | 102013113754 A1 | 6/2015 | |
| JP | H101-239191 A | 9/1989 | |
| JP | 2018203400 A | 12/2018 | |
| WO | WO-2006089702 A1 * | 8/2006 | ......... B65G 47/244 |
| WO | 2008/135720 A1 | 11/2008 | |
| WO | 2013/091012 A1 | 6/2013 | |

OTHER PUBLICATIONS

Written Opinion for PCT Application No. PCT/BR2019/050111 mailed Dec. 13, 2019 (5 pages).

* cited by examiner

FIG. 20
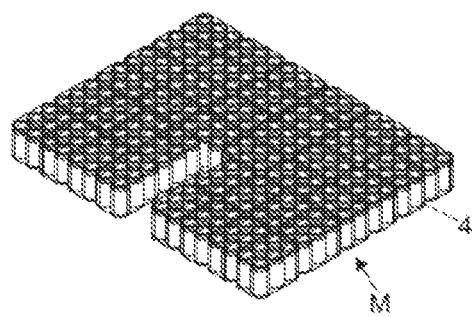
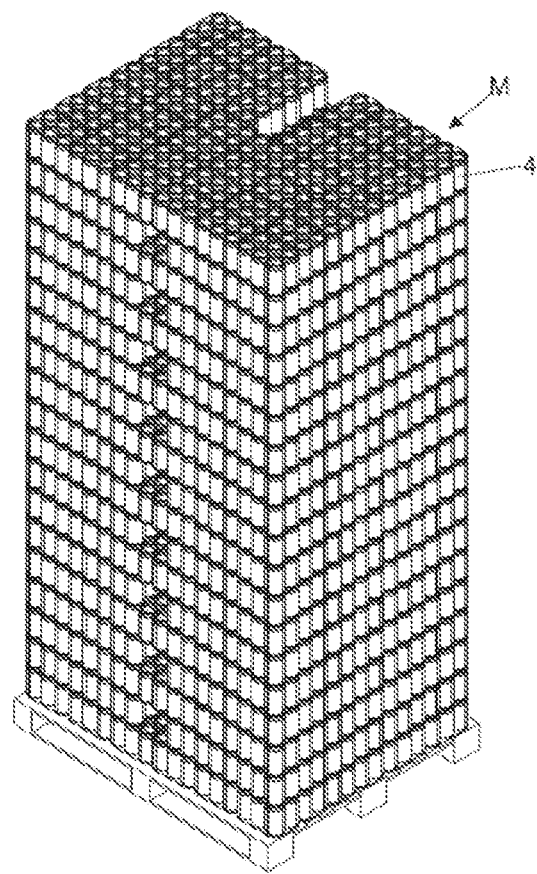

FIG. 21
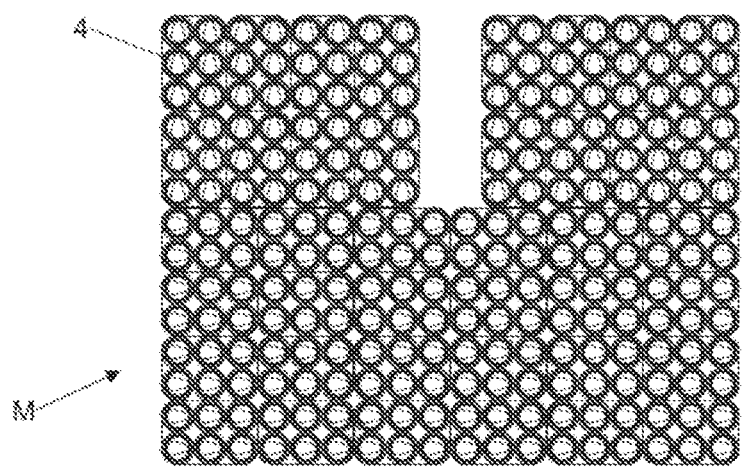
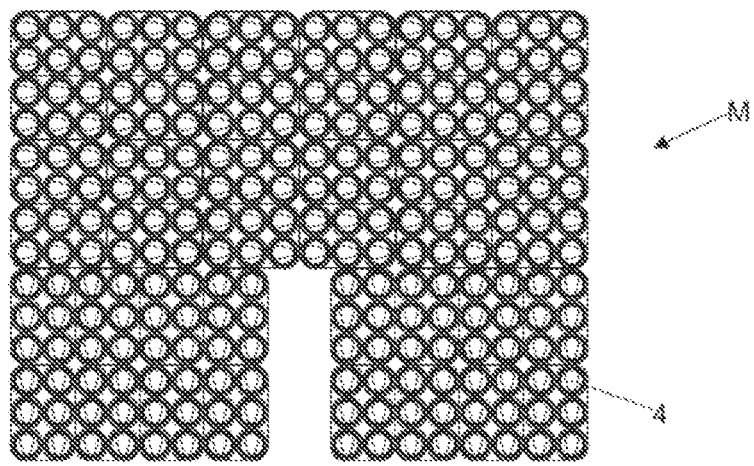

DEVICE FOR HANDLING PRODUCTS IN INDIVIDUAL OR GROUPED CONTAINERS BASED ON MOVEMENT BY ELASTIC PRESSURE IN THE TOP OF THE CONTAINERS

This application is a National Stage of PCT/BR2019/050111, filed 28 Mar. 2019, which claims benefit of 10 2019 005708 4, filed 22 Mar. 2019 in Brazil, which applications are incorporated herein by reference. To the extent appropriate, a claim of priority is made to each of the above disclosed applications.

INTRODUCTION

This application for a patent for the invention of a device, coupled to a robot or other handling system, deals with the pressure on the container, which allows the product to be moved to be held, moving and rotating them, defining its positioning and arranging them for later palletizing or positioning for subsequent operations.

FIELD OF THE INVENTION

The present invention has its field of application facing the industry and food and beverage distribution centers, and others, more specifically in the sector of preparation of layers (mosaics) of containers before palletization. For this, the palletizing process must be automated.

STATE OF ART

Currently, systems for preparing layers before palletizing or positioning for later operations are known: —Positioning system via PLC, which controls casters guiding the packages in the desired direction (intralox); —traditional system for forming flexible layers, using robots or other movement devices.

The system called intralox, can be exemplified in the U.S. Pat. No. 9,771,220B1, in which the entire drive system is positioned below the conveyor belt, as can be seen in FIG. 9B of this previous document, which is the biggest inconvenience of this work system.

Nevertheless, the use of this solution, in the handling of smaller packages, generates relative instability, notably due to the roller drive system. The inaccuracy of packaging positioning when moving them is another disadvantage of the system, while its flexibility is similarly reduced, particularly as the number of possible handling operations is limited by the system's mechanical hardware, which does not allow obtaining precision and agility, consequently making production more limited, precisely because of the limitations in movement.

Technically, a production line feeds a conveyor belt in a continuous process, which grows day by day. If the area dedicated to the grouping of products does not have a distribution solution compatible with this growth, problems will arise for the production chain.

In the traditional system of forming flexible layers, using robots or other movement devices, there is a limitation in the number of cycles per minute per "grippei' (grip). To increase the production of the system, in this case, they must be alternative feeding systems added, generating hardware changes in the packaging feeding system, as well as the inclusion of grippers of various sizes, in order to allow the movement of more than one package per operation. This can lead to an eventual discontinuity of production, increased operating area and increased energy consumption.

For the purpose of quoting a document that is close to the formation of flexible layers in the traditional system, we can report the document DE102013113754, in which the products come lined up in a feeding line where they are divided in a certain quantity to then enter the forming table already grouped in that quantity. The forming table is assisted by two robots that operate by gripping, one on each side, which have the function of picking up the set of products and leading them to the strapping station in front.

In the conventional system, robots operate on two axes, such that the products on the forming table are moved only in longitudinal or lateral directions, which is a factor determinant in reducing the work speed, requiring a larger working area and increasing, as stated, energy costs.

OBJECTIVES AND GENERAL CHARACTERISTICS OF THE INVENTION IN RELATION TO THE STATE OF THE TECHNIQUE

The present invention has as a preponderant characteristic, which incurs directly in objectives and advantages inherent to the device, the fact that, by increasing the movement speed (the device allows the execution of up to 150 movements per minute), a significant increase in the number of cycles/minute is achieved, with reliability. In this way, it is possible the need for less initial investment for the same production capacity, less space occupation (about 50% of the area required by traditional systems), substantially reducing the energy consumption involved in the operation.

According to the present invention, the device coupled to a robot, or other movement device, allows, by contact by elastic pressure, in combination with the operating software instructions, to take a container, single or grouped, from a position the other, according to combined displacements in transverse, longitudinal, clockwise and counterclockwise axes on the work table, with advantages and gains in terms of work agility, reduction of the usable area of operation and reduction of energy consumption, as already suggested.

Another feature or particular property of the invention resides in the device's automatic switching system, particularly in events of format change (quick set up), in which the operation suffers minimal interruptions, with quick resumption that improves the efficiency of the operation. The automatic changeover also provides a reduction in equipment downtime in the event of a device breakdown. To facilitate and enable this operation, the invention has one or more device magazines. This magazine houses the devices that are on stand by, either for replacement purposes in case of damage, or for changes in the dimensions of the desired device, in order to meet the necessary demands.

To meet the idealization of a device for handling products in containers, single or grouped, based on movement by elastic pressure at the top of the containers, as proposed by the invention, a dedicated software is provided for each application and moved by robot or other movement device, so as to allow the arrangement of totes in general.

Still in order to meet the purposes and objectives of the invention, it has a parameterization of data for device operation, necessary to guarantee the attack pressure of the device and the tension of the elastic element of the tote.

GENERAL DESCRIPTION OF THE INVENTION

The device, according to this patent application, is composed of a metallic structure or another type of material that allows the maintenance of the device's performance, to be coupled to the flange of a robot or other movement device. At the bottom of the device, an elastic blanket or material with related functions (elastic/polymer) is installed that maintains the integrity of the product handled and the integrity of the container and its movement, with this mentioned elastic blanket being easily interchangeable. The tensioning of the elastic element, whose function is to press the product, is defined by the characteristics of the handled product, as well as the type of movement necessary for the operation, in order to preserve and prevent damage to the container.

The device, object of the present invention, has a suitable coupling for each type robot or other handling equipment, with the tool change solution, which is done automatically, with stand-by devices (tool storage), strategically available in the work area, for cases of changing products to be handled, or in case of device break.

DESCRIPTION OF DRAWINGS

The invention will be, below, described in an embodiment, and, for better understanding, references will be made to the attached drawings, in which they are represented:

FIG. 6: Perspective view of a realization of coupling the device to the robot or movement device—robot side or the like;

FIG. 20: Shows, in perspective, as an example, a mosaic of containers formed by according to the device of the invention;

FIG. 21: Shows, in a top view, as an example, a mosaic of containers formed according to the device of the invention, as well as the mirror image of said mosaic;

DETAILED DESCRIPTION OF THE INVENTION

Figure 1:
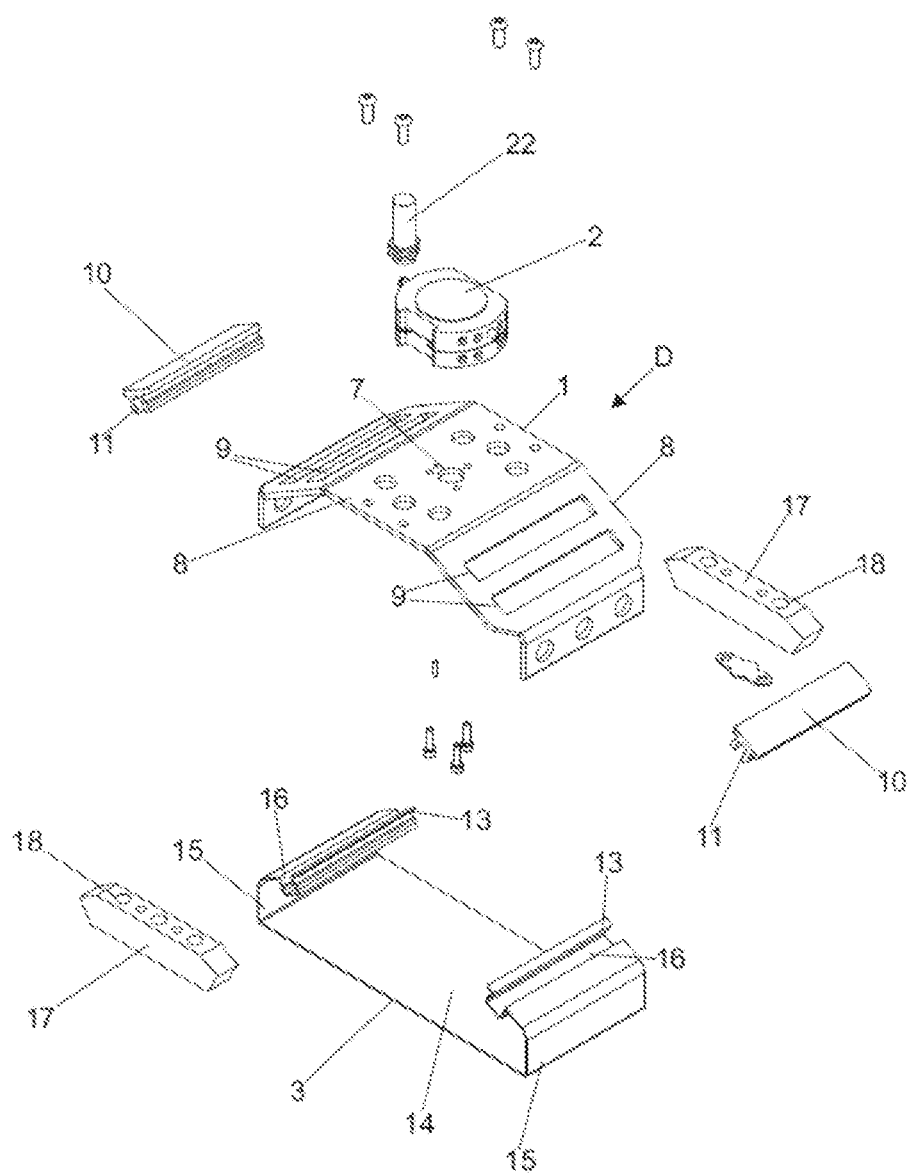
FIG. 1: Exploded perspective view of the device.
Figure 2:
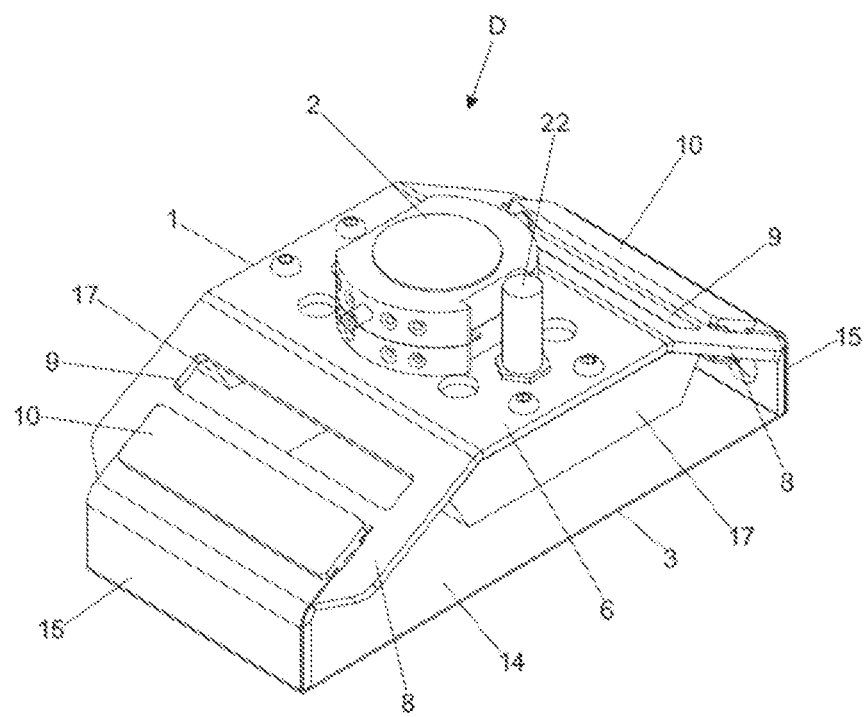
FIG. 2: Perspective view of the assembled device.
Figure 3:
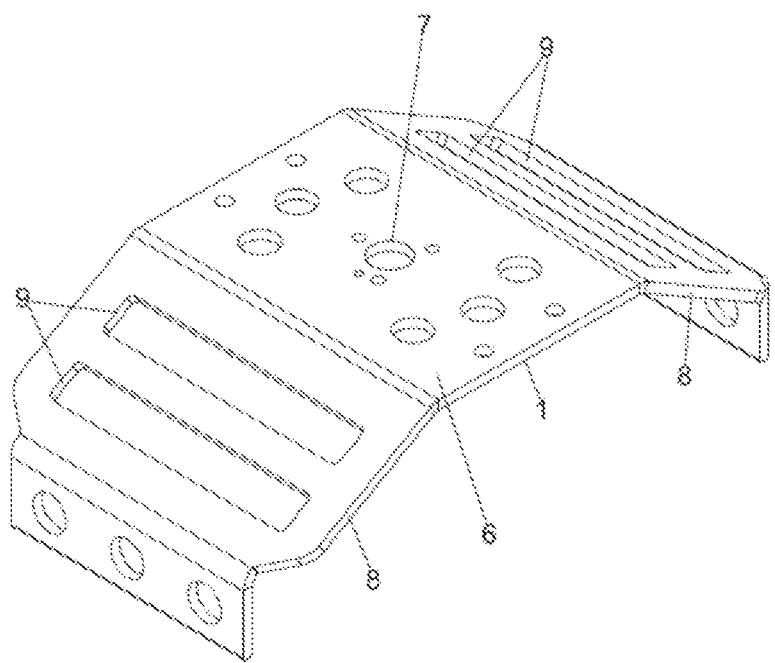
FIG. 3: Perspective view of the structure or head of the device.
Figure 4:
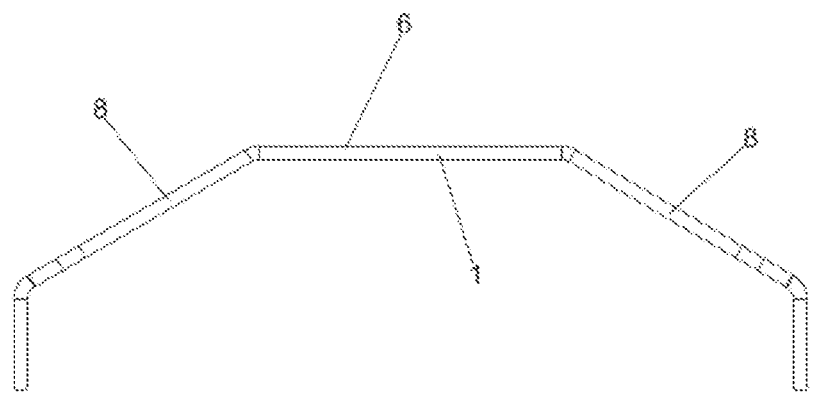
FIG. 4: Side view of the device's structure or head.
Figure 5:
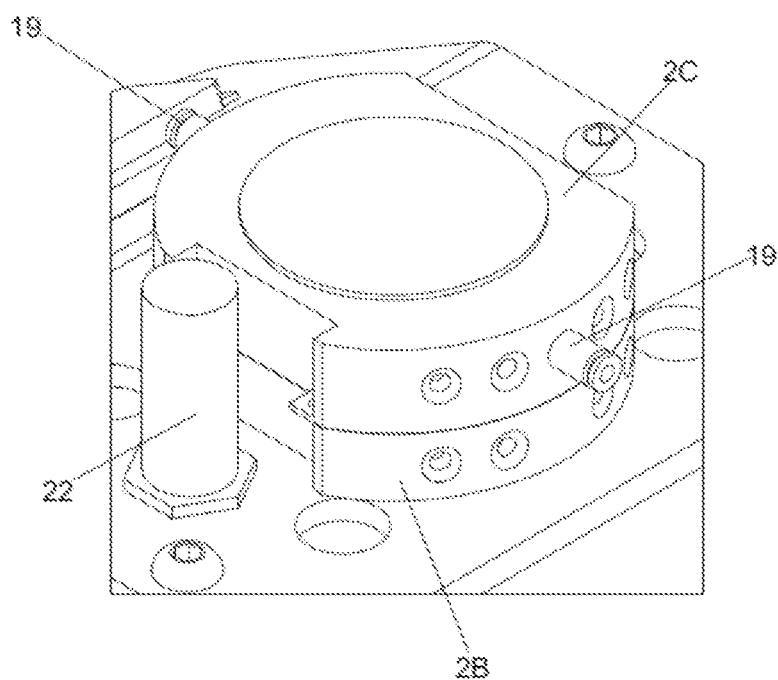
FIG. 5: Perspective view of a realization of coupling the device to the robot or Handling device—side device.
Figure 6:
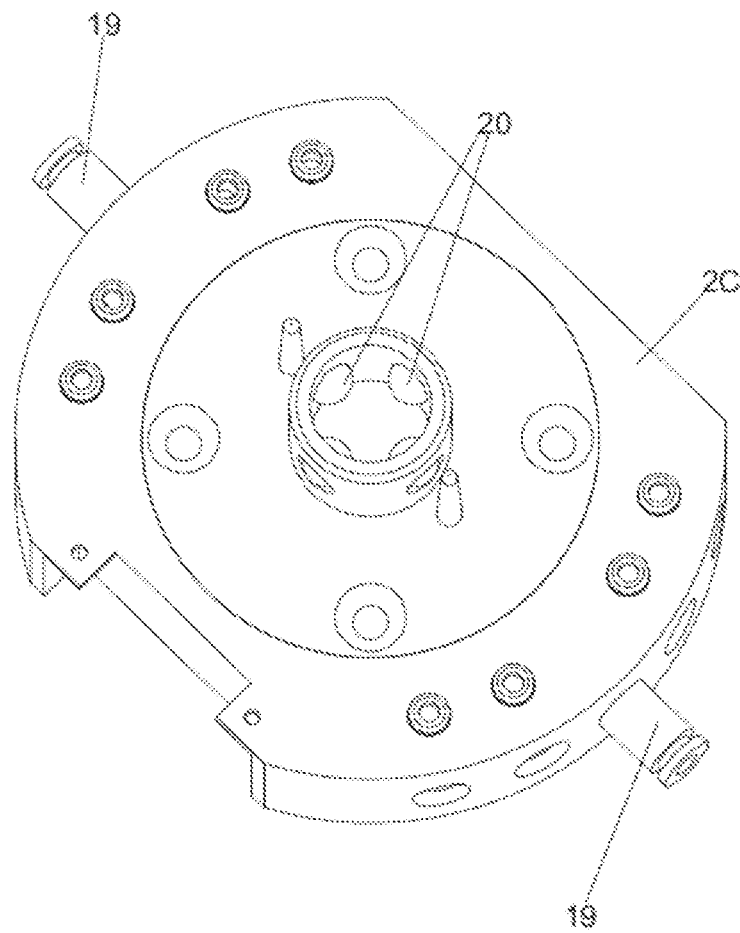
Figure 7:
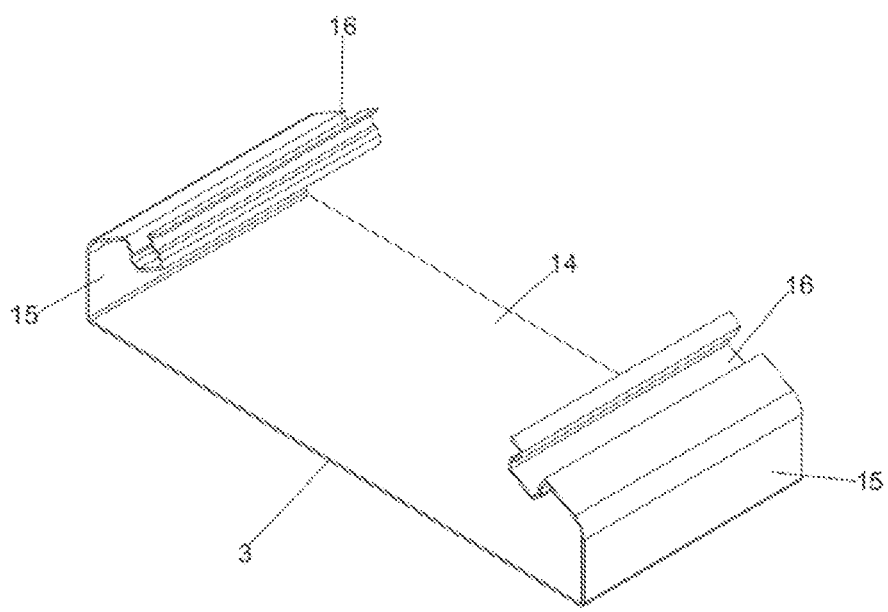
FIG. 7: Perspective view of the elastic blanket, in an embodiment.
Figure 8:
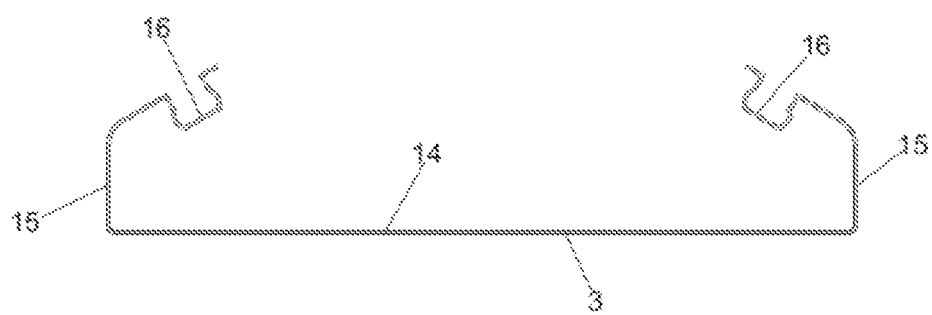
FIG. 8: Side view of the elastic blanket, in an embodiment.
Figure 9:
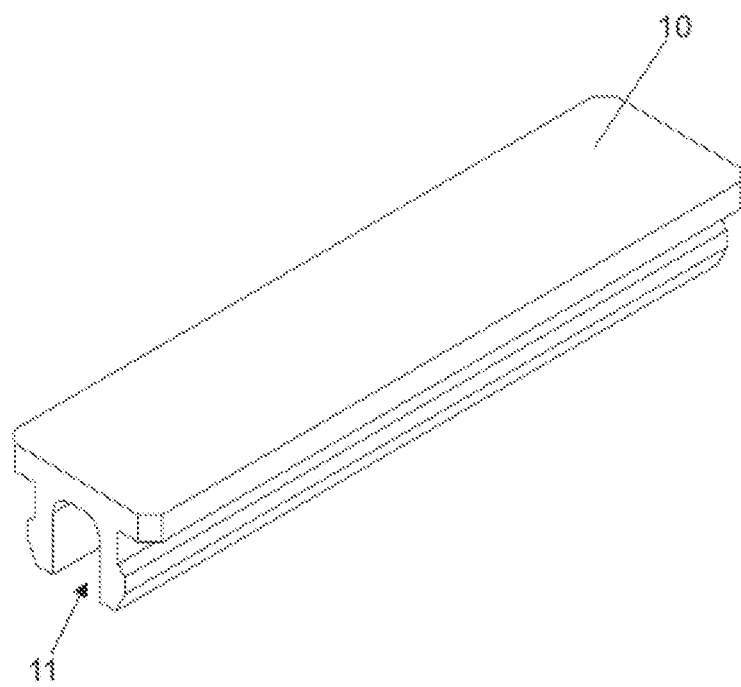
FIG. 9: Perspective view of an implementation of the elastic blanket fastening clip to the device structure.
Figure 10:
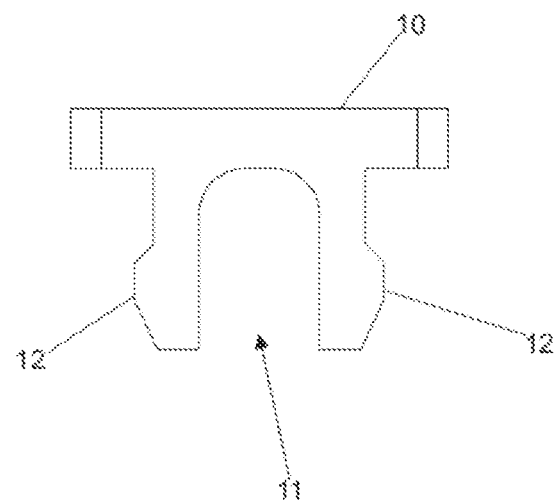
FIG. 10: Front view of an implementation of the elastic blanket fixation clip to the structure of the device.
Figure 11:
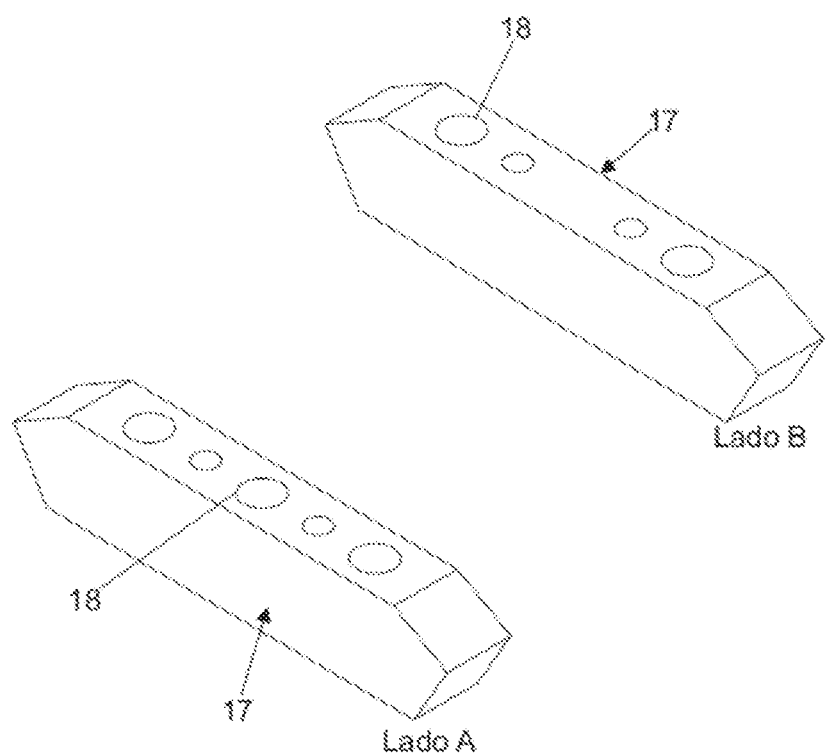
FIG. 11: Perspective view of the side bars supporting the device in the magazine—sides "a" and "b"
Figure 11B:
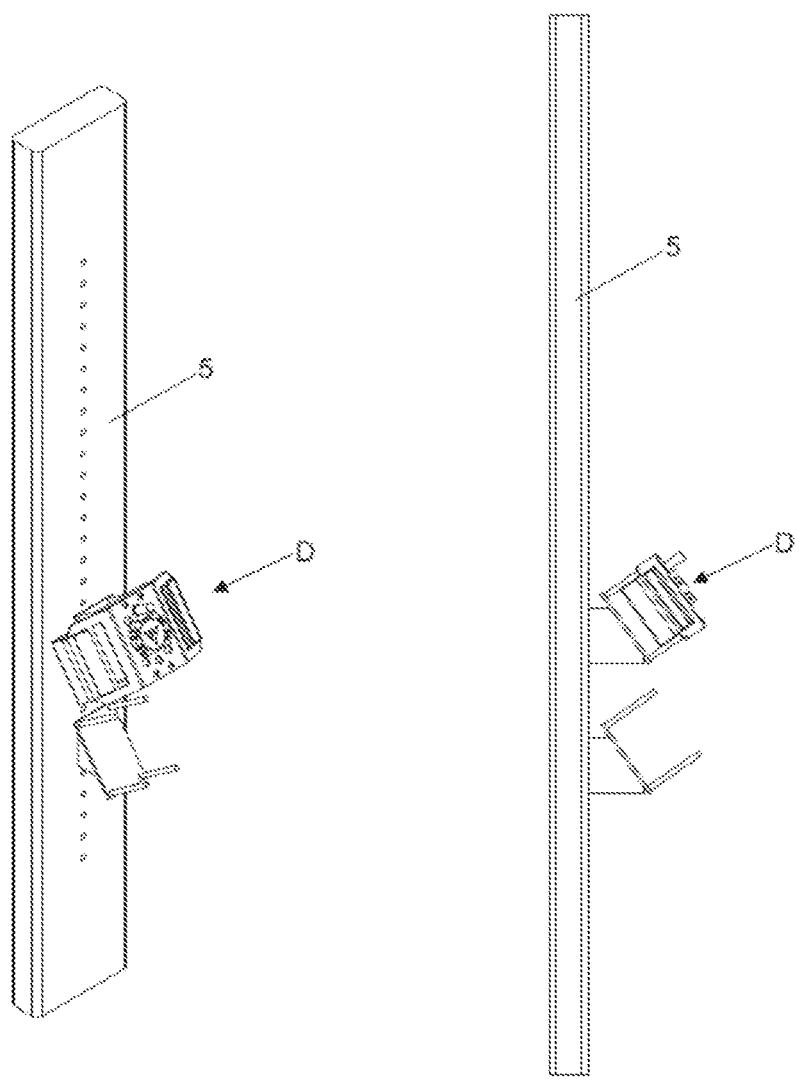
FIG. 11B: Perspective and side view of examples of realization of magazines to receive stand-by devices.

The DEVICE FOR HANDLING PRODUCTS IN CONTAINERS, SINGLE OR GROUPED, BASED ON MOVEMENT BY ELASTIC PRESSURE AT THE UPPER PART OF THE CONTAINERS, object of this patent application, comprises a device (D) composed of a head or structure (1) metallic, or in another type of material that allows the maintenance of the performance of the device (D) and can be conformed to the appropriate dimensions and characteristics (weight and strength), to be coupled, by means of a coupling (2), to a robot (R1) or other handling equipment; and, in the lower part of the device (D), an elastic blanket (3) made of material such as elastic/polymer is installed, which must have the property of maintaining the integrity of the product handled, in this case the container (4), single or grouped, and allow it to be moved over the work area (A1). The device (D), according to the invention, is operated from movements for the formation of layers or mosaics (M), using a dedicated software association enables the movement of the containers (4) in transverse and longitudinal axes, or rotating.

The device (D), according to the invention, has variable dimensions depending on the packages to be worked and has the particularity of being easily interchangeable; for that, a lateral magazine (5) has devices (D) waiting for possible replacement, based on the need generated by breakage or change in the type of containers to be moved. As an example, today there are packages, such as cans and others, with different volumes and dimensions, which is a determining condition for eventual replacement of the device (D).

The elastic blanket (3) has tensioning that aims to press the product or container (4) onto the work area (A1), this tensioning being determined by the characteristics of the product to be moved, as well as the type of movement necessary for the operation, in order to preserve and prevent damage to the tote (4).

The coupling (2), used to connect the device (D) to the robot (R1) or other movement equipment, is a component whose construction varies depending on the type of robot (R1) or other movement equipment, of in order to have an exchange solution made automatically, from the maintenance of devices (D) in stand-by, as mentioned above.

According to the constructive embodiment presented here, the device (D), according to the invention, has the structure (1) provided with a flat upper surface (6), provided with means (7) for fixing the coupling (2), and lateral sloping surfaces (8), equipped with transverse slots (9) for receiving the ends of the elastic blanket (3) and the respective fastening clips (10), these with hollow cores (11) and having hooks (12) so that they can generate elastic movements to secure the ends (13) of said elastic blanket (3) with the required efficiency, ensuring, in association with the material and length characteristics of said elastic blanket (3), the desired tension and required for operation on each different type of product.

The elastic blanket (3) assumes a geometric configuration compatible with the head or structure (1), its base (14) being of the flat type and the sides (15) designed with inclinations and couplings (16) to receive said fixing clips (10).

On the sides of the structure (1), particularly immediately below the upper flat surface (6), the plastic bars (17) supporting the device (D) in the magazine (5) are applied, being visible in said plastic bars (17) the differentiation in the quantity and positioning of the holes (18) provided for in the latter, a variation that is determined as a function of the delays with different pins in the magazine (5). That is, the plastic bars (17) are designed to be positioned in the magazine (5), when the format is quickly changed, allowing the device (D) to have a unique position in said magazine (5), regardless of the position of the pins in the magazine (5), not allowing the incorrect positioning of said device (D).

The coupling (2), as stated above, connects the device (D) to the robot (R1) or other handling equipment, and, in the embodiment shown in this invention, the coupling (2) is divided into a female coupling (2B)—device side (D), and in a male coupling (2C)—robot side (R1) or other handling equipment. In the male coupling (2C), hoses (19), preferably pneumatic, are connected for locking and unlocking between the parts of the male coupling (2C) and female coupling (2B), via interaction of locking balls (20). As stated earlier, such construction depends on the robot (R1) or other handling equipment; however, pneumatic movement in the couplings is preferably maintained.

An important aspect in the present invention is the parameterization of data for the device operation (D), being this so-called parameterization necessary to guarantee the attack pressure of the device (D) and the tension of the elastic blanket (3) in the container (4). Technically, the parameters of the elastic blanket (3) are defined in practice, taking into account the necessary dimension for said elastic blanket (3) and the characteristics of greater or lesser tension of the material used.

Thus, for the parameterization of the attack pressure of the device (D), it is defined as a basis the height of the tote (4) to be operated and additional advance gradients in the height of the device (D). That is, once height zero is established as the height of the tote (4), progressive and gradual advances are made, point by point, comparing, in each gradient, the movement condition of the tote (4), without causing any damage to the product being moved. Therefore, performance evaluations are carried out for each configuration and the best performance of the binomial positioning accuracy x device speed is defined, ideal pressure conditions that always maintain the integrity of the tote (4). These conditions are recorded in the software configuration.

Figure 12:
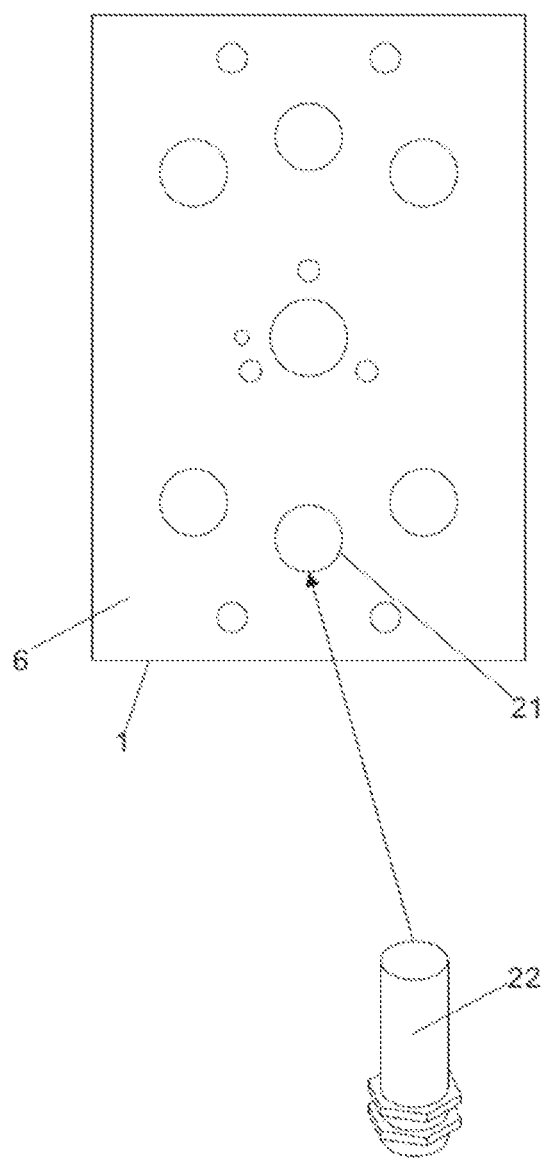
FIG. 12: Illustrates the structure of the device with holes, next to one of which the elastic blanket presence sensor is coupled.
Figure 13:
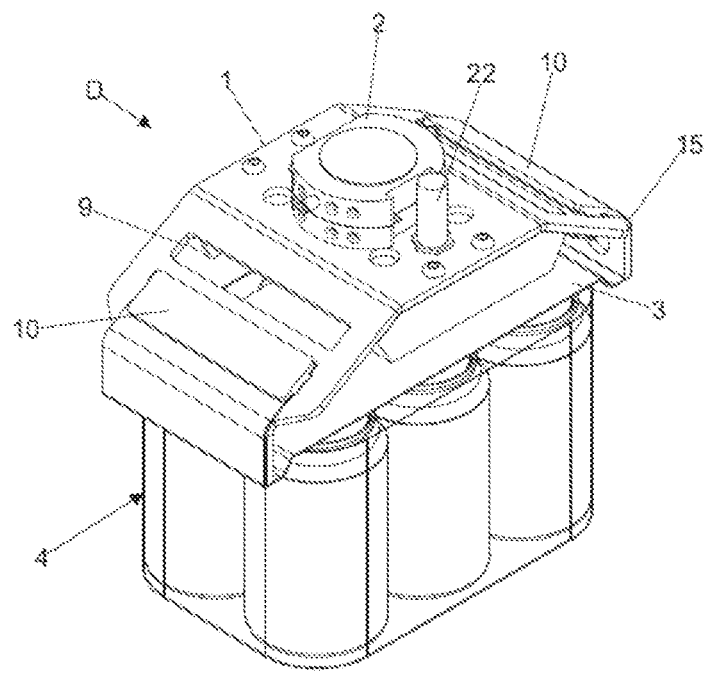
FIG. 13: Shows, in perspective, the device of the invention acting in a can container, the title of example achievement.
Figure 14:
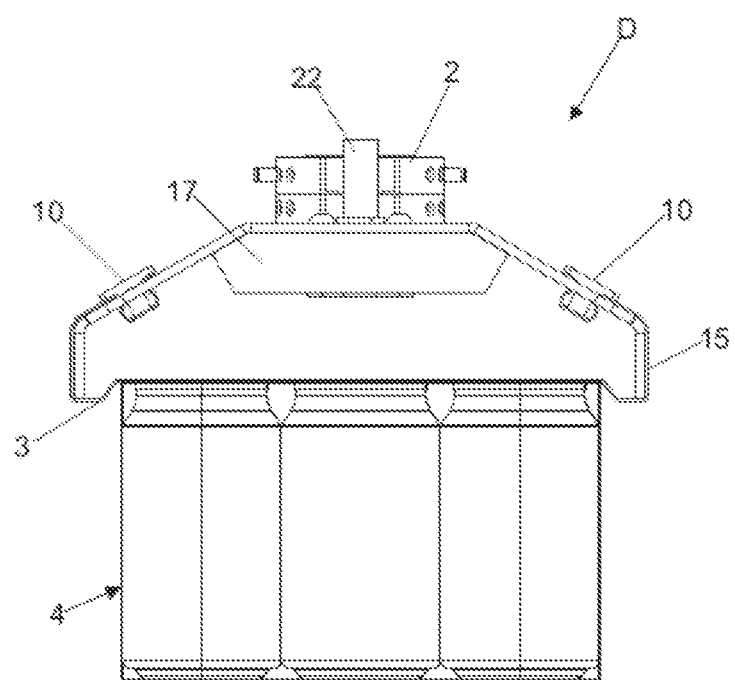
FIG. 14: Shows, in side view, the device of the invention acting in a can container, the title of example achievement.

FIG. 12 shows the structure of the device (D) with holes (21), next to one of which the presence sensor (22) of the elastic blanket (3) is coupled, so that, occurring, for example, in the event of rupture of the elastic blanket (3), immediately, the occurrence is detected and the immediate replacement of the device (D) is determined, which is done, as already explained above, without stopping the equipment; simply, the robot (R1) or other handling equipment leaves the defective device (D) in the magazine (5) and removes another device (D) in standby. This operation is immediate and takes a few seconds.

In the functional scope, the device (D) for moving and/or handling products in containers (4), single or grouped, is based on movement by elastic pressure in the upper part of said containers (4). This operation is controlled by a dedicated software for each application and movement by robot (R1) or other movement equipment, to enable the arrangement of totes (4), this technological solution being adapted to the different types and dimensions of totes (4), whether unique or grouped, and, within the logic of each program, the organization of the configuration of said containers (4) moved by subsequent operations is created, including the formation of layers for palletizing, or mosaics (M).

The operation of the device (D) occurs above a flat work area, allowing the entry of totes (4), whether single or grouped, and, within the logic of each program, creates the organization of the configuration of the totes (4) moved for subsequent operations, including the formation of layers for palletizing, mosaic type (M).

The operation of the device (D) takes place above a flat work area, which allows the ingress of totes (4) through conveyors. Upon entering the flat work area, the containers (4) are identified via software, in a previously established order, according to the attached flowcharts, and are moved accordingly to the desired formation.

The movement is done by the robot device arm (R1) or movement device, which positions the device (D) on the tote (4), through the aforementioned elastic pressure, controlled so as not to damage the tote (4), and drags it in a longitudinal, transverse and rotary movement (clockwise and counterclockwise) over the working area (A1), positioning the tote (4) in the exact position of the programmed arrangement.

With the technology of the present invention, from the combination of all the characteristics reported, there is a substantial evolution in the operation, resulting in the possibility of up to 150 cycles per minute.

Figure 15:
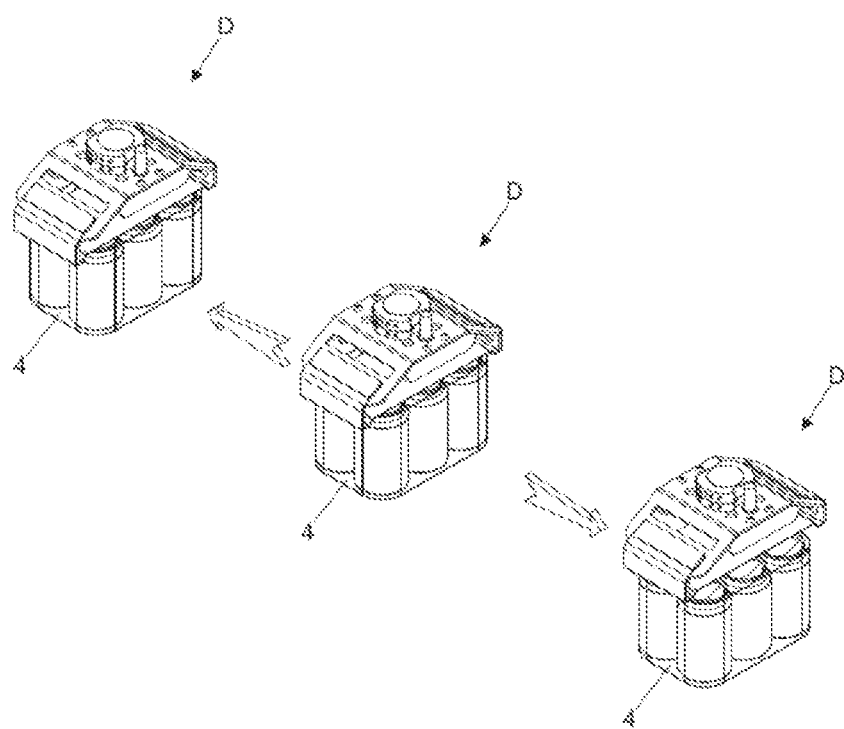
FIG. 15: Illustrates, in one embodiment, the movement of the device applied to a can container, according to transverse movement in the work area.
Figure 16:
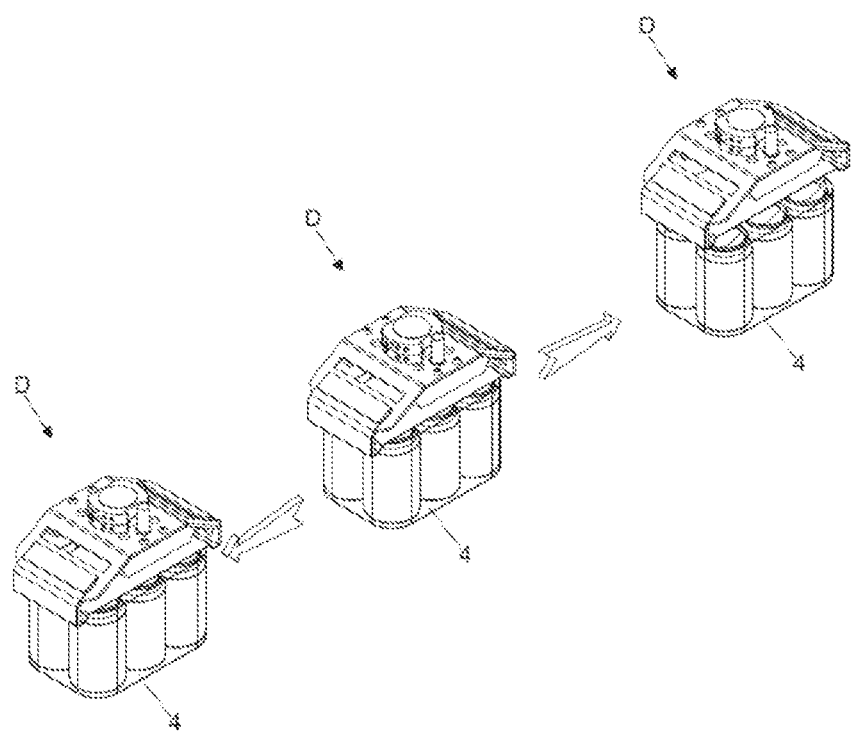
FIG. 16: Illustrates, in an embodiment, the movement of the device applied in a can container, second longitudinal movement in the work area.

FIG. 15, by way of example, shows a container (4) with six cans (L), with the device (D) coupled and illustrating a transverse movement of the container (4). The FIG. 16 shows, by way of example, a tote (4) with six cans (L), with the device (D) coupled and illustrating a movement in the longitudinal direction of the tote (4).

Figure 17:
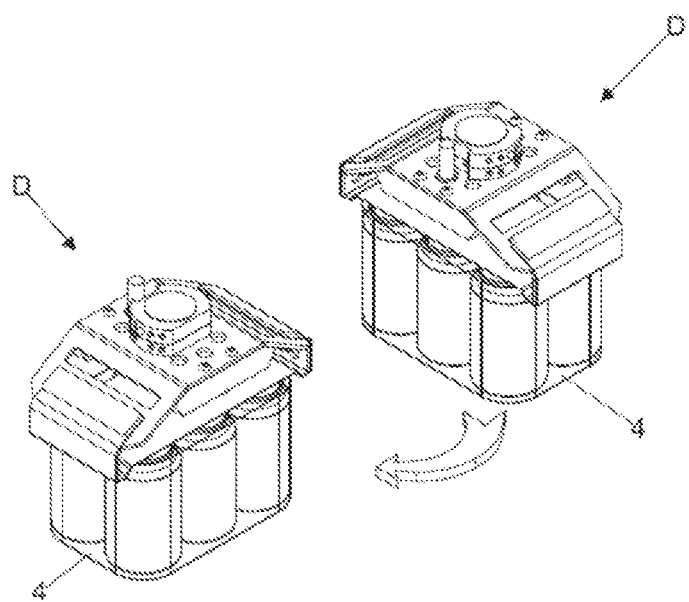
FIG. 17: Illustrates, in an embodiment, the rotary movement of the device of the invention in a clockwise direction, for rotation of the tote.
Figure 18:
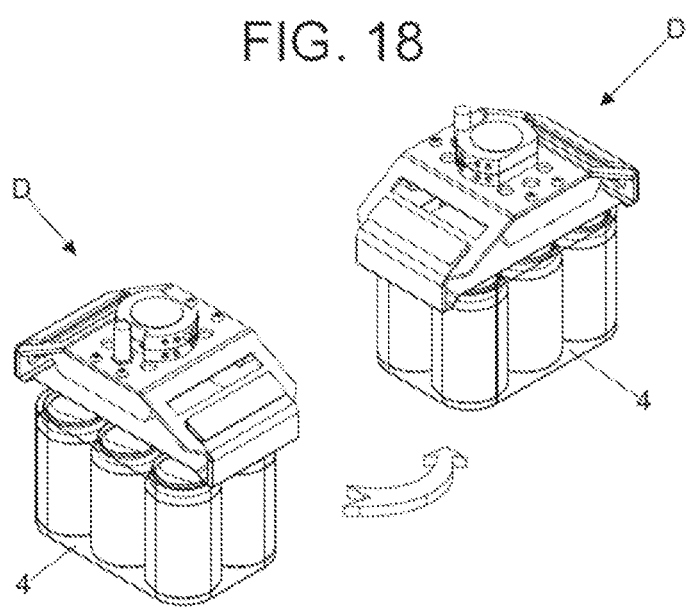
FIG. 18: Illustrates, in one embodiment, the rotary movement of the device of the invention counterclockwise for tote rotation.

FIG. 17 illustrates, by way of example, the clockwise rotation of a container (4) of six cans, with the device (D); while FIG. 18 shows the same container (4) with six cans (L), with the device (D) acting counterclockwise.

Figure 19:
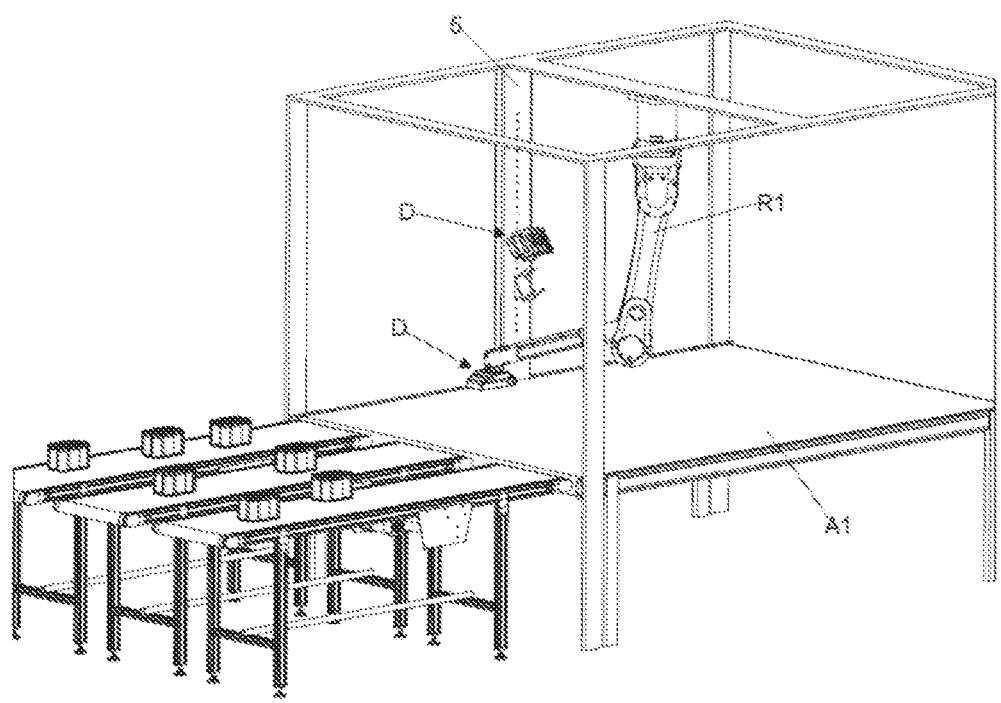
FIG. 19: Shows, by way of example and simple illustration, a fictitious workspace with a robot, a magazine and with the conveyors that reach this work area.

FIG. 19 illustrates, by way of example, within the possibilities of carrying out the invention, the formation of a mosaic (M) with the use of the device (D) of the invention, including several containers (4).

Figure 22:
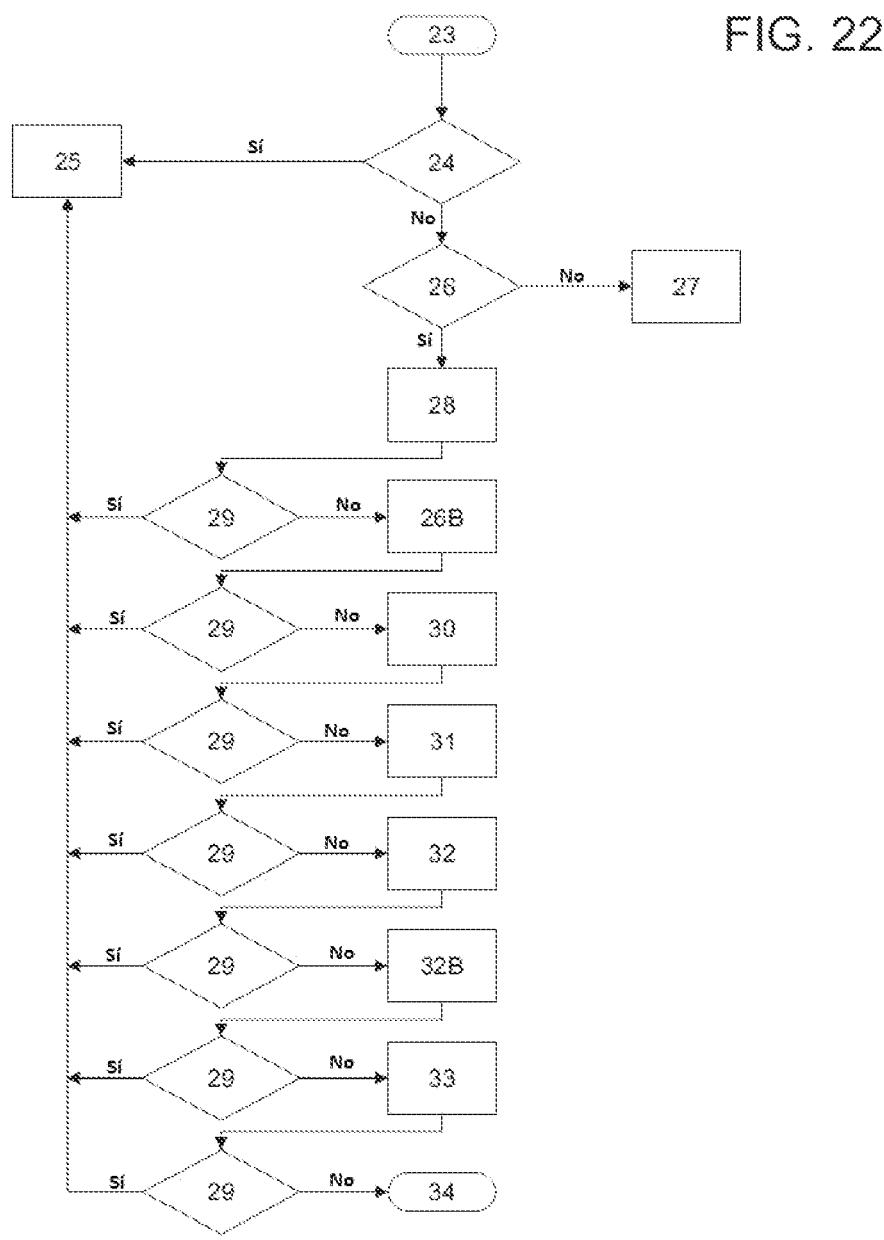
FIG. 22: Shows the flowchart of the macro structure of the program implemented by the dedicated software for moving the device of the invention.

FIG. 22 shows a flowchart of the macro structure of the program implemented by the dedicated software for moving the device of the invention on the desktop (A1).

In this flowchart there is a command "start" (23), which asks if they are "emergency conditions?" (24); if so, the equipment goes to the "emergency routine" query (25); if not, the question "automatic conditions?" (26); the answer in (26) being negative, it goes to the "manual routine" (27); the answer in (26) being yes, the "program management routine" (28) is generated, which asks "emergency conditions?" (29); if so, it goes to the "emergency routine" (25). If the answer is negative, one goes to the "device speed control routine" (26B) (check whether a table speed setup is required for each product).

Next, the "device speed control routine" (26B) asks if they are "emergency conditions?" (29), if yes, it goes to the "emergency routine" (25), if not, it goes to the "unit feeder routine" (30), and the latter asks if they are "emergency conditions?" (29), if yes, it goes back to the "emergency routine" (25), if not, it goes to the "device table routine" (31); this step asks if they are "emergency conditions?" (29), if yes, it returns to the "emergency routine" (25), if not, it goes to the "device axis routine" (32), this routine asks if they are "emergency conditions?" (29), if yes, it returns to the "emergency routine" (25) and, if not, it goes to the "lock routine" block (32B); this asks if they are "emergency conditions?" (29); if positive, it returns to "'emergency routine" (25), if not, it goes to "layer introducer routine" (33); this asks if they are "emergency conditions?" (29), if yes, it goes back to the "emergency routine" (25), if not, "closure" (34).

Figure 23:
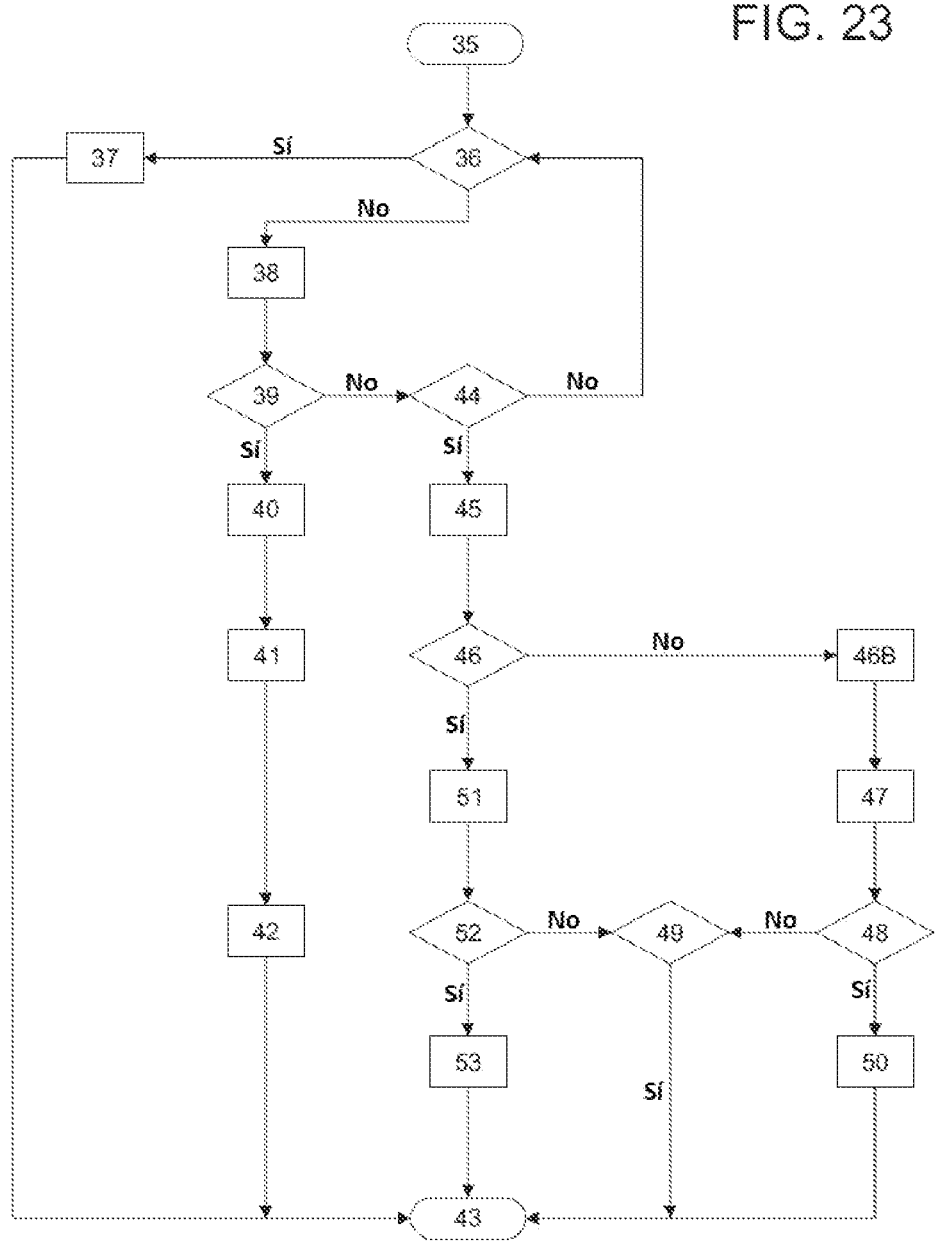
FIG. 23: Shows the program management flowchart, that is, for control routines editing, loading and retrieving layer formation programs for moving the device of the invention.

FIG. 23 shows the program management program, particularly aimed at routines for editing control, loading and retrieval of layer formation programs. In this flow, the beginning (35) is shown, which leads to the question of "layer adjustment?" (36), if yes, go to "recover layer routine" (37), if not, go to block "select program" (38) and, from there, to block "run" (39).

If the "run" block (39) has a positive response, it goes to the block that "copies the selected program from the program area to the device's work area" (40), from which it goes to "zero counters" (41) followed by the block that "defines the start and end points of the claw profile" (42), from this it follows to the closure-block "end" (43).

If in "run" (39) the answer is negative, it goes to the "edit" block (44), if not, it returns to "layer adjustment?" (36), if so, go to the block "select program" (45), from there to "copy program?" (46); this one, with a negative answer, goes to the block "copy selected program from the program area to the editing area" (46B), followed by the block "edit program" (47) and the block "save?" (48); this one having a negative answer goes to the "cancel" block (49) and from there to the "end" block (43); the answer in "save?" (48) if positive, one goes to the block "copy program from the editing area to the program area" (50) and from there to the block "end" (43).

Should the answer in "copy program?" (46) is positive, we go to the block "select destination program" (51), then we go to the block "paste?" (52), if the answer is negative, go to the block "copy program from source to destination" (53) and from there to "end" (43).

Figure 24:
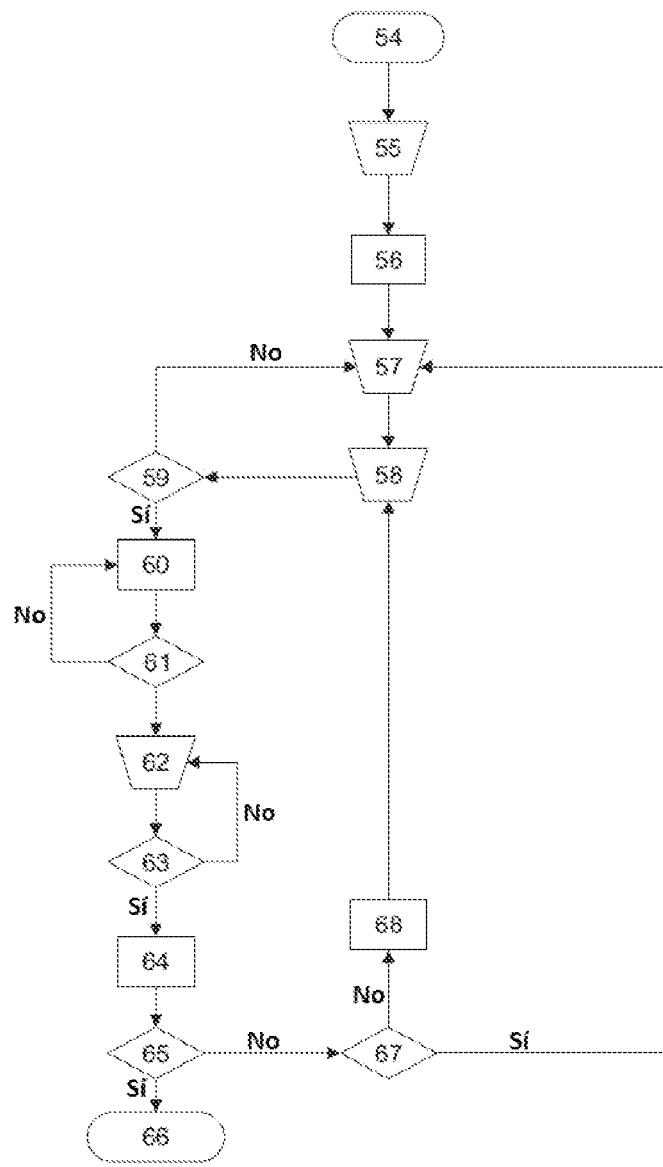
FIG. 24: Shows the program editing flowchart, that is, for routine loading of axis positions for each layer unit, for moving the device of the invention.

FIG. 24 shows the program editing flowchart, to configure a routine that loads axis positions for each layer unit with manual axis movements. From "beginning" (54) we go to the block "fill in product data" (55) and from there to the block that "resets counters and pointers" (56), which "selects the unit to be edited" (57) and, sequentially, "select axis to rotate unit" (58); from there, go to the block "enable enter unit" (59), if not, return to "select the unit to be edited" (57); if so, go to the block "moves feeder and table until the shaft picks up the unit" (60); then asks if "got it?" (61), if not, it goes back to "moves feeder and table until the axle picks up the unit" (60), if so, it goes to the block "moves manual axle to the unit drop position" (62); then you go to the "teach stitch?" (63), if not, it returns to (62), if it is, it goes to the block "save axes position for that unit" (64), asking, then, if "is it the last unit?" (65), if positive, go to "end" (66), if not, go to block "select unit?" (67); this answer, being negative, goes to the block "increases counters and pointers" (68) and, from there, to (58); if the answer is positive, it returns to (57).

Figure 25:
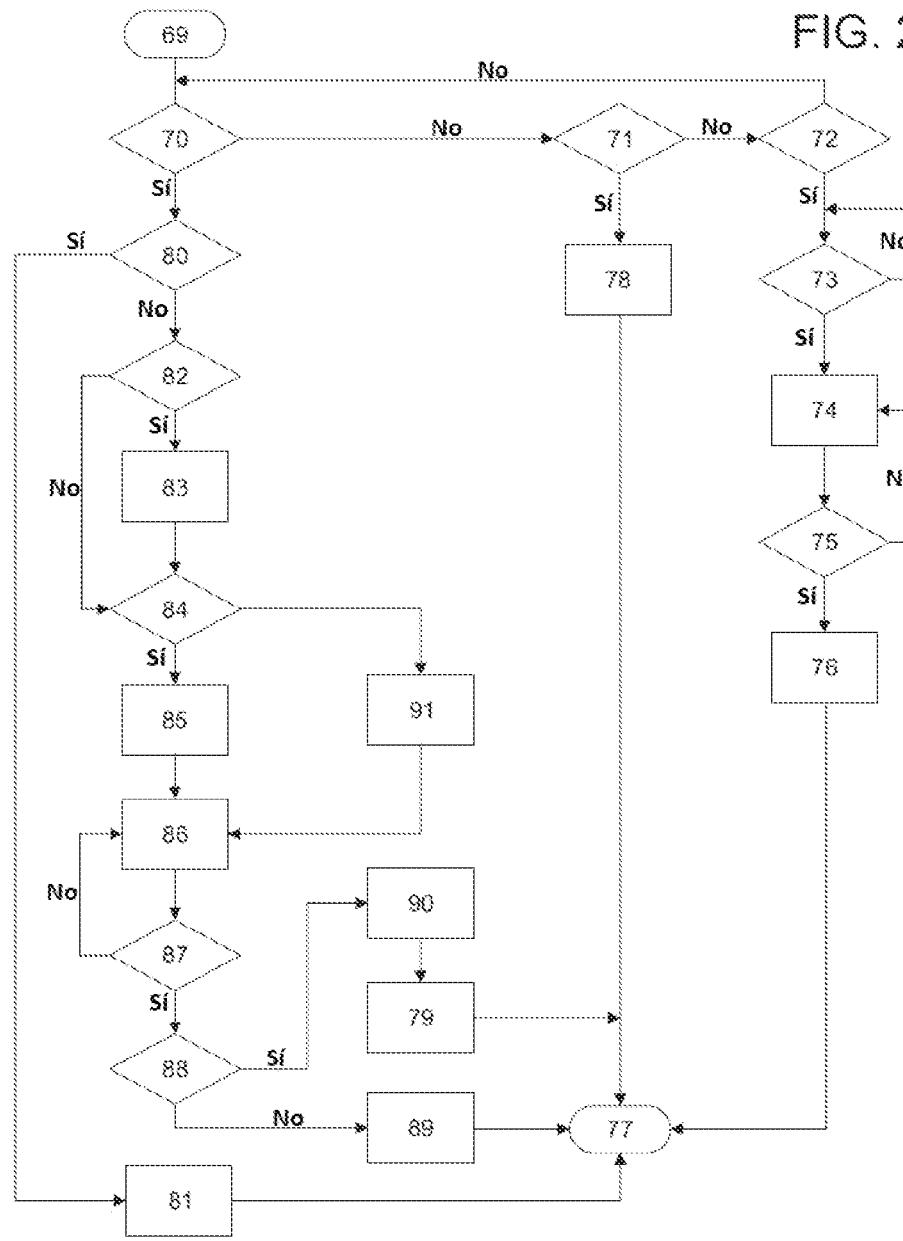
FIG. 25: Shows the flowchart of the unit feeder, that is, the routine for inputting units on the desktop.

FIG. 25 shows the flow of the unit feeder, establishing the routine for input of units into the device. The "start" block (69) goes to the "automatic mode?" (70); if the answer is negative, we go to the block "manual mode?" (71) with the answer in the negative, goes to "program edit mode?" (72), with a negative answer, we go back to the beginning. If the answer in (72) is positive, we go to the block "enable to enter unit?" (73), with the negative answer, we return to the output of (72), with the positive answer in (73) we go to the block "connect feeder motor" (74) and this one to the block "unit passed?" (75), this one, having a negative answer, goes back to (74), with the positive answer goes to the block "switch off the feeder motor" (76), this one having a negative answer, goes to the "end" block (77). The answer in "manual mode?" (71) if positive, one goes to the "manual feeder routine" block (78), from where it extends to the "end" (77), passing through the output of the block "zero units counter and start a new layer" (79).

The block "automatic mode" (70), having a positive response, leads to the block "desktop full?" (80), if the answer is positive, it goes to the block "switch off the feeder motor" (81) and, from there, to the "end" (77). If the answer in (80) is negative, the block is activated "lock down?" (82) and, if the answer is yes, the block "disable full desktop supervision" (83) is triggered, and then the block "is it odd layer?" (84); answer in (82) being negative, go straight to block (84), answer in (84) being positive, go to block "read odd layer configuration" (85), followed by "feeder motor alloy" (86), asking whether the "drive passed?" (87), the answer in (87) being negative, returns to (86), the answer being positive, the block "is it the last unit?" (88), if this answer is negative, one goes to the block "increment counters of units" (89) and, from there, to the "end" (77); if the answer in (88) is positive, one goes to the block "enable full desktop supervision" (90) and then to the block "zero units counter and start new layer" (79), going to " end" (77). If the block "is it an odd layer?" (84) has a negative answer, goes to the block "read configuration of the even layer" (91), this one communicating with the block "switch on feeder motor" (86).

The invention claimed is:

1. A device for handling a container wherein movement of the containers is induced by providing elastic pressure on the top of the containers, wherein the device comprises a metallic head coupled by means of a coupling to a robot, wherein the device comprises a lower part providing an elastic web adapted to exert a pressure on the container over a defined working area; wherein, in use, the device may be moved along a transverse, longitudinal or rotary axis; wherein the device further comprises a tensioning system designed to press the container over the working area, wherein tensioning and attack pressure exerted by the elastic web pressed against the container is determined by the characteristics of the container to be moved, the type of movement required for operation, the height of the container, and the binomial positioning and speed of the device; wherein these conditions are recorded in a software configuration; wherein, further, the structure of the device comprises holes, adjacent to one of which is provided a presence sensor of the elastic web is coupled, so as to signal eventual tearing of the elastic web.

2. The device of claim 1 wherein the device further comprises an upper flat surface, a means for fixing the coupling, and lateral inclined surfaces equipped with transverse slits for the reception of the tips of the elastic web and of the respective clamps, and hollow cores and having lugs so that they can generate elastic movements to secure the tips of said elastic web; wherein said elastic web assumes a geometrical configuration compatible with the head, the base of the elastic web being of the planar type and the sides designed with the slopes and interlocks for receiving said clamps (10).

3. The device of claim 1 wherein, in use, the elastic web assumes a geometrical configuration compatible with the head, the base of the elastic web being of the planar type and the sides designed with the slopes and interlocks for receiving one or more fastening clips.

4. The device of claim 1 wherein, on the sides of the head are attached plastic bars for supporting the device in a magazine, wherein the differentiation in the amount and positioning of the holes provided in the latter, variation in the magazine is determined as a function of one or more studs with different pins in the magazine; the plastic bars are designed to be positioned in the magazine when quickly changing shape, by allowing the device to have a unique position in said magazine, regardless of the position of the pins in the magazine, not allowing the incorrect positioning of said device.

5. The device of claim 1 characterized in that the coupling is divided into a female coupling that is on the device, and a male coupling that is on the robot.

6. The device of claim 1 characterized by the container being moved longitudinally, transversely and clockwise over the working area, and an operating speed of up to 150 cycles per minute, in order to make tiles from the movement of the containers on the cited shafts and gyros.

7. The device of claim 1 characterized by the fact that the elastic web has tension towards pressing a product in a container or the container on the work area, this tensioning is determined by features of the product to be handled, as well the type of handling required for operation, taking into account material aspects and the size of the elastic web.

8. The device of claim 1 characterized by the fact that two spaced arms include inclined side surfaces, equipped with a transverse slot to receive the ends of the elastic web and a plurality of fastening clips, these fastening clips being with hollow cores and hooks so that they can generate elastic movements to fix the ends of said elastic blanket; said elastic web and its geometric configuration compatible with the head, the bases of the elastic blanket being flat and the sides designed with inclinations and hooks to receive the said fixing clips (10).

9. The device of claim 1 characterized by the fact that the elastic web assumes the geometric configuration compatible with the head, the bases of the elastic blanket being of the flat type and the sides designed with the inclinations and hooks to receive one or more fixing clips.

10. The device of claim 1 characterized that the coupling is divided into a female coupling of the device and a male coupling of the robot.

\* \* \* \* \*